United States Patent
Hirsch et al.

(10) Patent No.: US 10,113,064 B2
(45) Date of Patent: *Oct. 30, 2018

(54) WATER SOLUBLE INK-JET COMPOSITION FOR 3D PRINTING

(71) Applicant: STRATASYS LTD., Rehovot (IL)

(72) Inventors: Shai Hirsch, Rehovot (IL); Avraham Levy, Petach Tikva (IL); Eduardo Napadensky, Netanya (IL)

(73) Assignee: STRATASYS LTD., Rehovot (IL)

( * ) Notice: Subject to any disclaimer, the term of this patent is extended or adjusted under 35 U.S.C. 154(b) by 34 days.

This patent is subject to a terminal disclaimer.

(21) Appl. No.: 15/406,011

(22) Filed: Jan. 13, 2017

(65) Prior Publication Data

US 2017/0130048 A1    May 11, 2017

Related U.S. Application Data

(63) Continuation of application No. 14/859,856, filed on Sep. 21, 2015, now Pat. No. 9,546,270, which is a continuation of application No. 12/841,622, filed on Jul. 22, 2010, now Pat. No. 9,138,981.

(60) Provisional application No. 61/227,446, filed on Jul. 22, 2009.

(51) Int. Cl.
| | | |
|---|---|---|
| *C08L 1/00* | (2006.01) |
| *B33Y 70/00* | (2015.01) |
| *B33Y 10/00* | (2015.01) |
| *B29C 67/00* | (2017.01) |
| *C08L 71/00* | (2006.01) |
| *B29C 64/112* | (2017.01) |
| *B29C 64/40* | (2017.01) |
| *C08J 3/07* | (2006.01) |
| *B29K 71/00* | (2006.01) |

(52) U.S. Cl.
CPC .......... *C08L 71/00* (2013.01); *B29C 64/112* (2017.08); *B29C 64/40* (2017.08); *B29C 67/0059* (2013.01); *B29C 67/0092* (2013.01); *B33Y 10/00* (2014.12); *B33Y 70/00* (2014.12); *B29K 2071/00* (2013.01); *H05K 999/99* (2013.01)

(58) Field of Classification Search
CPC ....................................................... C08L 71/00
USPC ................................................. 524/570, 543
See application file for complete search history.

(56) References Cited

U.S. PATENT DOCUMENTS

| | | |
|---|---|---|
| 5,397,397 A | 3/1995 | Awad |
| 6,437,034 B2 | 8/2002 | Lombardi et al. |
| 6,790,403 B1 | 9/2004 | Priedeman, Jr. et al. |
| 7,479,510 B2 | 1/2009 | Napadensky et al. |
| 9,546,270 B2 * | 1/2017 | Hirsch .................. B33Y 70/00 |
| 2003/0149216 A1 | 8/2003 | Ichihashi et al. |
| 2007/0168815 A1 | 7/2007 | Napadensky et al. |

* cited by examiner

*Primary Examiner* — Duc Truong
(74) *Attorney, Agent, or Firm* — Pearl Cohen Zedek Latzer Baratz LLP

(57) ABSTRACT

A material composition, which may be a support material, for three-dimensional (3D) inkjet printing is disclosed. The material composition may comprise a glycol polymer, a low molecular weight polar substance and a surface-active agent. The glycol polymer may be polyethylene glycol (PEG) having a molecular weight between about 1000 and about 6000 and the low molecular weight polar substance may be dimethyl hexanediol.

14 Claims, No Drawings

WATER SOLUBLE INK-JET COMPOSITION FOR 3D PRINTING

CROSS REFERENCE TO RELATED APPLICATIONS

This application is a continuation application of U.S. patent application Ser. No. 14/859,856, filed Sep. 21, 2015, which in turn is a continuation application of U.S. patent application Ser. No. 12/841,622, filed Jul. 22, 2010, now U.S. Pat. No. 9,138,981, which claims the benefit of U.S. Provisional Patent Application No. 61/227,446, filed Jul. 22, 2009, the content of all of which are incorporated herein in their entirety.

BACKGROUND OF THE INVENTION

Additive Manufacturing (AM) is generally a process in which three-dimensional (3D) objects are manufactured utilizing a computer model of the objects. These processes are used in various fields, such as design related fields for purposes of visualization, demonstration and mechanical prototyping, as well as for rapid manufacturing (RM).

Various techniques of AM exist, one such technique, otherwise known as 3D inkjet printing, being performed by a layer by layer inkjet deposition of building materials. Depending on the building materials, the layers are then cured or solidified. The building materials may include modeling materials and support materials, which form the object and the temporary support constructions supporting the object as it is being built. In cases where objects include overhanging features or shapes, e.g. curved geometries, negative angles, voids, and so on, objects are typically constructed using adjacent support constructions, which are used during the printing and then subsequently removed in order to reveal the final shape of the fabricated object.

During the AM process, at least one material ("object material" or "modeling material") is deposited to produce the desired object but frequently a second material ("support material" or "supporting material") is used to provide support for specific areas of the object during building and assure adequate vertical placement of subsequent object layers. Both materials, i.e modeling material and supporting material might be initially liquid and are subsequently hardened to form the required layer shape. The hardening process may be performed by a variety of methods, such as UV curing, phase change, crystallization, drying, etc. In all cases, the support material is deposited in proximity of the modeling material enabling the formation of complex object geometries and filling of object voids.

In such cases, the removal of the support structure thus formed is liable to be difficult and time consuming, and may damage the formed object.

Examples of materials that can be used as supporting materials are phase change materials, e.g., wax. These, at an appropriately high temperature, melt and thus permit support removal in the liquid state. One of the drawbacks of the phase change is that the temperature required for melting the supporting material may also cause deformation of the model structure.

Soluble supporting materials are especially appropriate for supporting small parts, because large masses of soluble material may require a lengthy period of time for dissolving.

To diminish such problems, the fabricated object is often immersed in water or in a solvent that is capable of dissolving the support materials. In many cases, however, the cleaning process may involve hazardous materials, manual labor and/or special equipment requiring trained personnel, protective clothing and expensive waste disposal. In addition, the dissolving process is usually limited by diffusion kinetics and may require very long periods of time, especially when the support constructions are large and bulky.

When using currently available commercial print heads, such as ink-jet printing heads, the support material must have a relatively low viscosity (about 10-20 cPs) at the working temperature so it can be jetted. Further, the support material should harden rapidly in order to allow building of subsequent layers. Additionally, the support material must have sufficient mechanical strength for holding the model material in place and low distortion for avoiding geometrical defects.

Known methods for removal of support materials include mechanical impact (applied by a tool or water-jet), as well as dissolution in a solvent, with or without heating. The mechanical methods, however, are labor intensive and are unsuited for small intricate parts. Further, the known dissolution methods sometimes require the use of aggressive chemical solvents that require safety precautions in both use and disposal. Additionally, the use of high temperatures during support removal may be problematic since there are model materials that are temperature sensitive, such as waxes and certain flexible materials. Such methods for removal of support materials are especially problematic for use in the office environment, where ease-of-use, cleanliness and environmental safety are major considerations.

In light of the above, it would be highly advantageous to have a material for use in 3D inkjet printing, that can be removed quickly and preferably automatically, by dissolution in water, or a non-hazardous water solution, rather than in aggressive chemical solvents. For this purpose, it is important that the material composition itself be, for example, non-toxic and environmentally safe.

One such class of materials known in the art, which is highly soluble in water, includes glycol based polymers such as polyethylene glycol (PEG). However, although such polymers are available in grades that may have a high enough melting point, suitable for 3D ink-jetting, such grades are frequently too viscous, e.g. for ink jet, and solidify relatively slowly, and therefore, are not suitable for use directly as material for 3D inkjet printing purposes.

Therefore, it is the object of this invention to provide a composition for 3D inkjet printing, featuring a balance between water-solubility, melting temperature, viscosity and solidification speed.

SUMMARY OF THE INVENTION

In an embodiment of the invention, there is provided a material composition for three-dimensional (3D) inkjet printing comprising a glycol polymer, a low molecular weight polar substance and a surface active agent.

In some embodiments of the invention, the polar substance is di- or poly-alcohol.

In some embodiments of the invention, the material composition is a soluble support composition for 3D inkjet.

In some embodiments of the invention, there is provided a method for 3D inkjet printing comprising building a 3D object in layers, wherein at least one layer comprises a model material composition and a support material composition comprising PEG and a low molecular weight polar substance, wherein said layers are solidified before deposition of subsequent layers; and wherein, after solidification, the support material composition is removed by immersion of the solidified objet with the support in a liquid composition comprising a solvent.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

This invention provides a composition for use in 3D inkjet printing. According to some embodiments of the invention, the material composition is water soluble. The composition comprises a glycol polymer and a low molecular weight polar substance, as well as appropriate surface active agents. In an embodiment of the invention the material composition is used as a support material. In some embodiments of the invention, the polar substance is di- or poly-alcohol.

According to certain embodiments, the amount of the glycol polymer is in the range of 10-70% w/w of the material composition.

According to another embodiment of the invention, the amount of the glycol polymer is in the range of 10-65% w/w of the material composition.

According to another embodiment of the invention, the amount of the glycol polymer is in the range of 10-60% w/w of the material composition.

According to another embodiment of the invention, the amount of the glycol polymer is in the range of 10-55% w/w of the material composition.

According to another embodiment of the invention, the amount of the glycol polymer is in the range of 10-50% w/w of the material composition.

According to another embodiment of the invention, the amount of the glycol polymer is in the range of 15-45% w/w of the material composition.

According to another embodiment of the invention, the amount of the glycol polymer is in the range of 15-40% w/w of the material composition.

According to another embodiment of the invention, the amount of the glycol polymer is in the range of 20-35% w/w of the material composition.

According to another embodiment of the invention, the amount of the glycol polymer is in the range of 20-30% w/w of the material composition.

In some embodiments of the invention, the amount is about 25%. By the term "about" it is meant ±10%.

According to further embodiments, the amount of the low molecular weight polar substance is 30-90% w/w of the material composition.

According to an embodiment of the invention, the amount of the low molecular weight polar substance is 35-90% w/w of the material composition.

According to another embodiment of the invention, the amount of the low molecular weight polar substance is 40-90% w/w of the material composition.

According to another embodiment of the invention, the amount of the low molecular weight polar substance is 45-90% w/w of the material composition.

According to another embodiment of the invention, the amount of the low molecular weight polar substance is 50-90% w/w of the material composition.

According to another embodiment of the invention, the amount of the low molecular weight polar substance is 55-90% w/w of the material composition.

According to another embodiment of the invention, the amount of the low molecular weight polar substance is 60-85% w/w of the material composition.

According to another embodiment of the invention, the amount of the low molecular weight polar substance is 65-85% w/w of the material composition.

According to another embodiment of the invention, the amount of the low molecular weight polar substance is 70-85% w/w of the material composition.

According to another embodiment of the invention, the amount of the low molecular weight polar substance is 70-80% w/w of the material composition.

According to some embodiments of the invention, the amount of the low molecular weight polar substance is about 75%.

According to certain embodiments, the surface active agent reduces the surface tension of the material to a level of 27-33 mN/m as appropriate for ink-jetting. In and embodiment of the invention the amount of the surface active agent is between 0.01-5%.

According to one embodiment, the glycol polymer is polyethylene glycol (PEG).

In order to achieve a material with physical properties appropriate for ink-jet printing, according to one embodiment the molecular weight of the PEG in the material composition is about 1000-6000. According to a further embodiment, the molecular weight of the PEG is 1000-2000, having a melting point about 45° C. and a relatively high water solubility. According to yet a further embodiment, the molecular weight of the PEG is 1500.

Although some specific molecular weights of PEG may solidify at a low temperature, for example about 45° C., suitable for 3D ink-jet printing, it is frequently too viscous for jetting via ink-jet printing heads at temperatures of about 85° C. In addition, its rate of solidification at said low temperature is relatively slow, negatively affecting 3D printing throughput. Therefore it might be concluded that PEG is not best suited for use on its own, directly as a material for 3D inkjet printing purposes.

It was surprisingly found that combining certain molecular weights of PEG (such as PEG 1500) with some low molecular weight polar substances (such as 1,8 octanediol), results in a material composition with lower viscosity at the elevated temperatures than the same molecular weight PEG alone, and at the same time, with much faster solidification rate at the same lower temperature.

In addition, it was surprisingly found that some specific low molecular weight polar substances produced a solid material with melting point temperature of about 45° C., and which is water soluble.

One of the experiments was conducted with 1,8 octanediol and PEG 1500. This finding is especially surprising in light of the fact that octanediol is not significantly water soluble and therefore would not be an obvious choice for inclusion in a composition which is desired to be highly water soluble. In addition, in light of the fact that very similar polar substances, for example decane diol, almost completely suppress the water solubility of the composition resulting from combining with PEG.

In addition, it was unexpectedly found that this combination provides a desirable combination of low viscosity, suitable for use at lower jetting temperatures, high water solubility, and a high rate of solidification.

It must be remarked that appropriate viscosity (e.g. ~10-20 cps) for jetting at a temperature of about 85° C. is significantly improved over the same viscosity obtained at higher temperature, because the higher the jetting temperature, the more difficult it is to cool the material after jetting to solidification temperature.

In some embodiments of the present invention, the low molecular weight polar substance is a low molecular weight di- or poly-alcohol.

The resulting combination of PEG and said low molecular weight di- or poly-alcohol lowers the viscosity of the material composition, thus enabling the use of lower jetting temperatures and the jetting of larger material composition drops.

According to one embodiment, the low molecular weight di- or poly-alcohol is a linear and hydrophilic alcohol. According to another embodiment the di- or poly-alcohol is a $C_6$ to $C_{10}$ linear diol. According to a further embodiment, the low molecular weight di- or poly-alcohol is a polyol with relatively low melt viscosity and a melting point suitable for 3D inkjet printing. According to yet a further embodiment, the low molecular weight di- or poly-alcohol is 1,8-octanediol, 1,6-octanediol and 1,6-hexanediol. Other examples of diols are without limitation: 1,3-cyclopentanediol, trans-1,2-cyclooctanediol, 3,6-dithia-1,8-octanediol, 1,6-hexanediol, 1,7-heptanediol, 1,8-octanediol, 1,9-nonanediol, 1,2-cyclohexanediol, 1,4-Cyclohexanediol, 2,5-dimethyl-3-hexyne-2,5-diol, 2,5-Dimethyl-2,5-hexanediol. Low molecular weight polyols with low melt viscosities and suitable melting points may also be used.

Examples of polyols are: 1,2,4-butanetriol, 1,2,6-hexanetriol, 1,2,3-heptanetriol, 2,6-dimethyl-1,2,6-hexanetriol, 1,2,3-hexanetriol, 1,2,3 -butanetriol, 3-methyl-1,3,5-pentanetriol, 1,2,3 -cyclohexanetriol, 1,3,5-cyclohexanetriol, 3,7,11,15-tetramethyl-1,2,3-hexadecanetriol, 2-hydroxymethyl-tetrahydropyran-3,4,5-triol, 1,1,1-Tris(hydroxymethyl) propane, 2,2-Diethyl-1,3-propanediol, 1,2,7,8-Octanetetrol.

According to one embodiment of the invention, the low molecular weight di- or poly-alcohol is 1,8-octanediol.

In order for the material composition to be water soluble, both the glycol polymers and the low molecular weight di- or poly-alcohol used are hydrophilic, and therefore, have high surface tension. Therefore, according to this invention, the material composition further includes a surface active agent, in order to ensure the proper functioning of the print head. The surface active agent according to this invention may be any suitable agent, providing the above properties to the material composition.

According to one embodiment of this invention, the surface active agent is BYK345, BYK307 or BYK347.

According to one embodiment the material comprises about 75% 1,8-OctaneDiol, about 25% PEG1500 and about 0.5% BYK345 or any other suitable surface active agent. According to an additional embodiment the material composition comprises about 70% 1,8-OctaneDiol, about 30% PEG1500 and about 0.5% BYK345 or any other surface active agent. According to yet another embodiment the material comprises about 80% 1,8-OctaneDiol, 20% PEG4000 and about 0.5% BYK345 or any other surface active agent.

According to this invention, when used for example to construct a support construction providing support for a 3D object as it is being built, the material of the invention is removed from the printed object after hardening or solidification by washing or immersing in a solvent. In an embodiment of the invention the solvent is water. In another embodiment, the solvent comprises water and an alcohol. In a further embodiment, the alcohol is ethanol.

In an embodiment of the invention, the material composition comprises a glycol polymer, a low molecular weight polar substance and a surface active agent. The material composition is water miscible before hardening and water soluble after hardening According to certain embodiments of the invention, the components of the material composition may have a low saturation concentration in water at room temperature, though have a higher saturation concentration at moderately elevated temperatures. For example, only about 0.3% w/w 1,8-octanediol dissolves in water at 20° C., but at 40° C. approximately 30% w/w dissolves. Thus, when using such components, the dissolving liquid used for material composition dissolving may be heated to the appropriate temperature; however, the temperature should preferably be not higher than 100° C. In an embodiment of the invention, the dissolving liquid temperature should not be higher than 80° C. In another embodiment of the invention, the dissolving liquid temperature should not be more than 60° C. In yet another embodiment of the invention, the dissolving liquid temperature should not be more than 40° C., in all of these cases so as not to damage the printed object, or induce geometric deformations. Nonetheless, if the object produced by AM process is very sensitive to temperature, e.g., includes waxes, solvents other than water may be used for dissolving the material at even lower temperatures, either together with water or without water. Suitable solvents include ethyl alcohol and N-methyl-2-pyrrolydone. A suitable water dissolving composition comprises for example 50% water +50% ethyl alcohol.

According to further embodiments, the water or the solvent used for material dissolving may be mechanically agitated, thus significantly reducing dissolving times at a given temperature. According to one embodiment the agitation is applied by air bubbles, thus creating minimal stress and impact during the dissolving process. Other possible methods are mechanical stirring, water streams and ultrasonic actuators. As detailed in Table I in the Examples section below, the physical properties of the soluble material composition comprising 75% 1,8-OctaneDiol, 24.5% PEG1500 and 0.5% BYK345 are superior for ink jetting than those of either PEG1500 or 1,8-octanediol alone.

In an embodiment of the invention, the support material removal process produced as waste solution by-product comprising dissolved support material composition combined with the solvent used for its dissolving. The waste solution thus produced is cooled to room temperature or lower than room temperature. At such low temperatures (room temperature or less) the dissolved support solution in the solvent at least partially crystallizes, permitting at least partial separation of liquids and crystallized solid composition, for easy, safe removal of the resulting waste.

Tables II and III provide comparative data of melting point (mp), dissolution rate and solidification rate of various compositions comprising different glycol polymers, different low molecular weight di- or poly-alcohols and combinations thereof. The preferred compositions are those having a melting point (mp) which is between 45° C.-70° C., a dissolution rate which is lower than 20 minutes and/or a solidification rate which is lower than 30 seconds Further, additional advantages of the material composition comprising both the PEG and a low molecular weight polar substance at the specified amounts, are listed below, comparing the material composition to each of its main components, i.e., PEG and a diol:

The material composition crystalline state has smaller crystalline regions than the diol alone and is therefore more homogenous and isotropic.

The material composition has lower contraction than the diol alone.

Once solidified, the material composition is harder than PEG and tougher than the diol.

Once solidified, the material composition is dissolved in water as fast as PEG, or even faster, even when the PEG amount is small (~10%) and is dissolved considerably quicker than the diol alone.

The addition of the diol allows the use of higher molecular weight PEG grades (up to about 4,000-6,000) that otherwise would have resulted in too high viscosity and too low solubility.

In another embodiment of the present invention, the material composition is used for printing easily-removable masking elements, for example, selective masking for object surface treatment.

In a further embodiment of the present invention, the material composition may be used for building water soluble three-dimensional objects, for example used in the process of the preparation of molds for replication of said three-dimensional objects using said mold, and a different material for the building of the 3D object replica.

In one embodiment the material composition of the present invention is used as a soluble support material for ink jet 3D printing.

In another embodiment of the present invention, the material composition of the present invention is soluble in water or ethyl alcohol or N-methyl-2-pyrrolydone or a combination thereof.

Printing process—The composition container is heated to above the melting point of the material. The material is pumped through a heated pipe to the print-head as necessary. Droplets of the material are jetted onto the required places on the work-piece and solidify upon cooling. When the printing process is complete, the part (composed of model and support) is transferred to an agitated bath containing water heated to over 30° C. whereupon the support material is dissolved leaving the finished part (made of model material). After rinsing in tap water and drying the part is ready for its intended use (including post-processing such as painting).

Various aspects of the invention are described in greater detail in the following Examples, which represent embodiments of this invention, and are by no means to be interpreted as limiting the scope of this invention.

EXAMPLES

Tables I-III below provide comparative data regarding the viscosity, surface tension, solidification rate and dissolution time of composition comprising different glycol polymer, different low molecular weight di- or poly-alcohols and combination thereof.

The methods for measuring these parameters are as follows:

Melting point was measured in a Krüss melting point meter (A. KRÜSS Optronic GmbH, Germany). The range of values for each composition indicates the beginning and ending of the melting process.

Dissolution time was measured in an SRS™ Clean Station® (PM Technologies, USA) water circulating bath at 40° C. Samples were added (one milliliter) to plastic cups into which the formulation was cast. Dissolution time is defined as the time required/taken for full dissolution of the material in the cup.

Solidification time was measured by placing drops of material at 90° C. by a pipette onto a glass plate at 25° C. and visually observing the time for solidification of the entire drop.

Table I below compares the viscosity, surface tension, solidification rate and dissolution time of PEG1500, 1,8-octandiol, and a material composition comprising 75% 1,8-OctaneDiol, 24.5% PEG1500 and 0.5% BYK345. As was mentioned before, the optimal compositions are those having a melting point (mp) which is between 45° C.-70° C., a dissolution rate which is lower than 20 minutes and a solidification rate which is lower than 30 seconds.

TABLE 1

|  | Viscosity at 80° C. (cPs) | Surface tension at 90° C. (mN/m) | Solidification rate[1] (sec) | Dissolution time[2] (hour) |
|---|---|---|---|---|
| Optimal range for 3D ink-jetting | 10-20 | 27-33 | <10 | <1 |
| PEG1500 | 45 | 41 | 30-60 | <1 |
| 1,8 octanediol | 13 | 38 | 1-5 | 6-12 |
| Support material | 17 | 32 | 2-10 | <1 |

[1]Solidification times for drops (50-100 picoliter) at 30-45° C. This time must be shorter than about 10 sec (the time after which a consecutive layer is deposited).
[2]Dissolution times - for this test an arbitrary criterion was chosen of dissolution time of less than 1 hour for a mass of 1 kg, or the inside of a narrow tube with a 1:5 dimension ratio (1 mm diameter for 5 mm length) at temperatures not exceeding 40° C.

According to the information provided in Table I, it appears that the properties of the material composition are better for 3D ink jet purposes than those of either the PEG1500 or the 1,8-octanediol, when tested separately.

Tables II and III provide comparative data for compositions comprising different glycol polymer, different low molecular weight di- or poly-alcohols and combinations thereof. As was mentioned before, the preferred compositions are those having a melting point (mp) which is between 45° C.-70° C., a dissolution rate which is lower than 20 minutes and a solidification rate which is lower than 30 seconds.

TABLE II

| Mixture | M.P. (° C.) | Dissolution time in Jacuzzi 40° C. (min.) |
|---|---|---|
| 1,10-Decandiol 100% (DD) | 70 | — |
| 1,10-Decandiol - 20%-PEG1500 80% | 47 | 40 |
| 1,8-octanediol 100% (OD) | 61 | 70 |
| 1,8-octanediol 50%-PEG1500 50% | 50-55 | 11 |
| 1,8-octanediol 75%-PEG1500 25% | 56-58 | 15 |
| 1,8-octanediol 50%-palmitic acid 50% | <50 | — |
| 1,8-octanediol 50%-myristic acid 50% | <50 | 15 |
| 1,8-octanediol 50%-octadecanol 50% | 53 | ~300 |
| 1,8-octanediol 33%-octadecanol 33%-PEG1500 33% | 51 | — |
| 1,8-octanediol 45%-octadecanol 10%-PEG1500 45% | | — |
| 1,8-octanediol 45%-octadecanol 10%-PEG1500 45%-TMP10% | | — |
| 1,8-octanediol 45%-octadecanol 10%-PEG1500 45%-TMP20% | | — |
| 1,8-octanediol 75%-octadecanol 5%-PEG1500 25%-TMP10% | | 60 |
| 1,8-octanediol 75%-octadecanol 5%-PEG1500 25% | | 60 |
| 1,8-octanediol 75%-octadecanol 2%-PEG1500 25% | | 25 |

TABLE II-continued

| Mixture | M.P. (° C.) | Dissolution time in Jacuzzi 40° C. (min.) |
|---|---|---|
| 1,8-octanediol 75%-octadecanol 1%-PEG1500 25% | | 18 |
| 1,8-octanediol 75%-hexadecanol 10%-PEG1500 25% | 52-55 | 25 |
| 1,8-octanediol 75%-hexadecanol 5%-PEG1500 25% | 55-57 | 15 |
| dimethyl-hexanediol | 86-90 | 10 |
| dimethyl-hexanediol-50% PEG1500 50% | 70-80 | 12 |
| dimethyl-hexanediol-75%_PEG1500-25% | 70-85 | 15 |
| dimethyl-hexanediol-75%_PEG4000-25% | 80-87 | 15 |

TABLE III

| Wax type | M.P. (° C.) | Solidification time (min) | Dissolution time in Jacuzzi 40° C. (min.) |
|---|---|---|---|
| peg1500 - 100% | 47 | 2:00 | 15 |
| PEG2000 - 100% | 52-54 | | |
| PEG3000 - 100% | 55-58 | | |
| PEG4000 - 100% | 58-61 | | |
| PEG20000 - 100% | 60-65 | | |
| 1,10-Decandiol 100% | 70 | 0:10 | — |
| 1,10-Decandiol - 20% peg1500 - 80% | 47 | 1:10 | 40 |
| 1,10-Decandiol - 30% peg1500 - 70% | | | 120 |
| 1,10-Decandiol - 40% peg1500 - 60% | | | 240 |
| 1,8-octanediol 100% | 61 | 0:10 | 70 |
| 1,8-octanediol 20% peg1500 - 80% | | >10:00 | 10 |
| 1,8-octanediol 30% peg1500 - 70% | | 5:00 | 15 |
| 1,8-octanediol 40% peg1500 - 60% | | 1:00 | 15 |
| 1,8-octanediol 50% peg1500 - 50% | 50-55 | 0:20 | 11 |
| 1,8-octanediol 75% peg1500 - 25% | 56-58 | 0:10 | 15 |
| 1,8-octanediol 90% peg1500 - 10% | | 0:05 | 30 |
| octanediol 75% - peg4000 25% | | 0:20 | 18 |
| octanediol 50% - peg4000 50% | | 0:40 | 25 |
| octanediol 25% - peg4000 75% | | 0:50 | 25 |
| octanediol 75% - peg35,000 25% | | | 60 |

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A material composition for three-dimensional inkjet printing comprising:
polyethylene glycol (PEG) having a molecular weight between about 1000 and about 6000; and
dimethyl hexanediol, wherein the composition has a melting point between 70° C.-85° C. and solidifies upon cooling.

2. The material composition according to claim 1, further comprises a surface active agent.

3. The material composition according to claim 1, wherein the material composition is water-miscible before hardening and water-soluble after hardening.

4. The material composition according to claim 1, wherein the amount of the PEG is 10-70% w/w of the material composition.

5. The material composition according to claim 1, wherein the amount of the dimethyl hexanediol is 30-90% w/w of the material composition.

6. The material composition according to claim 2, wherein the amount of the surface active agent is about 0.5% w/w of the material composition.

7. The material composition according to claim 1, wherein the molecular weight of the PEG is about 1500.

8. The material composition according to claim 1, wherein the material composition is a soluble support material for three-dimensional inkjet printing.

9. The material composition according to claim 1, wherein the material composition is soluble in water or ethyl alcohol or N-methyl-2-pyrrolydone or a combination thereof.

10. The material composition according to claim 2, wherein the molecular weight of the PEG is 1500, the amount of the PEG is about 25% w/w of the material composition and the amount of the dimethyl hexanediol is about 75% w/w of the material composition.

11. The material composition according to claim 2, wherein the molecular weight of the PEG is 1500, the amount of the PEG is about 50% w/w of the material composition and the amount of the dimethyl hexanediol is about 50% w/w of the material composition.

12. The material composition according to claim 2, wherein the molecular weight of the PEG is 4000, the amount of the PEG is about 25% w/w of the material composition and the amount of the dimethyl hexanediol is about 75% w/w of the material composition.

13. The material composition according to claim 1, wherein the dimethyl hexanediol is 2,5 dimethyl-3-hexyne-2,5-diol.

14. The material composition according to claim 1, wherein the dimethyl hexanediol is 2,5-Dimethyl-2,5-hexanediol.

* * * * *